(12) United States Patent
Sherman

(10) Patent No.: US 11,674,074 B2
(45) Date of Patent: *Jun. 13, 2023

(54) MATERIAL AND METHOD OF CONTROLLED ENERGY DEPOSITION

(71) Applicant: Terves, LLC, Euclid, OH (US)

(72) Inventor: Andrew Sherman, Mentor, OH (US)

(73) Assignee: TERVES, LLC, Euclid, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,223

(22) Filed: Oct. 7, 2021

(65) Prior Publication Data

US 2022/0025750 A1 Jan. 27, 2022

Related U.S. Application Data

(63) Continuation of application No. 17/192,500, filed on Mar. 4, 2021, which is a continuation of application No. 16/226,973, filed on Dec. 20, 2018, now Pat. No. 11,268,364.

(60) Provisional application No. 62/608,083, filed on Dec. 20, 2017.

(51) Int. Cl.
*E21B 43/26* (2006.01)
*C09K 8/66* (2006.01)
*C09K 8/80* (2006.01)
*C09K 8/68* (2006.01)
*C09K 8/88* (2006.01)

(52) U.S. Cl.
CPC .............. *E21B 43/26* (2013.01); *C09K 8/665* (2013.01); *C09K 8/68* (2013.01); *C09K 8/805* (2013.01); *C09K 8/88* (2013.01)

(58) Field of Classification Search
CPC ............ E21B 43/26; C09K 8/665; C09K 8/68
USPC ....................................... 166/308.2
See application file for complete search history.

(56) References Cited

U.S. PATENT DOCUMENTS

| | | | |
|---|---|---|---|
| 7,166,560 B2 * | 1/2007 | Still | C09K 8/506 507/923 |
| 7,219,731 B2 | 5/2007 | Sullivan et al. | |
| 7,455,112 B2 * | 11/2008 | Moorehead | C09K 8/74 166/308.2 |
| 10,150,713 B2 | 12/2018 | Doud et al. | |
| 10,392,314 B2 | 8/2019 | Sherman et al. | |
| 2009/0084554 A1 | 4/2009 | Williamson et al. | |
| 2013/0192839 A1 | 8/2013 | Brown et al. | |
| 2017/0362499 A1 | 12/2017 | Welton | |
| 2018/0118634 A1 | 5/2018 | Sherman et al. | |

\* cited by examiner

*Primary Examiner* — William D Hutton, Jr.
*Assistant Examiner* — Ashish K Varma
(74) *Attorney, Agent, or Firm* — Ulmer & Berne LLP; Brian E Turung

(57) ABSTRACT

A high strength engineered reactive composite that includes a reactive core. These reactive composites are useful for oil and gas completions and well stimulation processes, enhanced oil and gas recovery operations, as well as in defensive and mining applications requiring high energy density and good mechanical properties.

21 Claims, 6 Drawing Sheets

TIME DELAY CONCEPT

2-PART REACTIVE (NON-AQUEOUS DELIVERY)

TRIGGERED PARTICLE

MATERIAL AND METHOD OF CONTROLLED ENERGY DEPOSITION

The present invention is a continuation of U.S. patent application Ser. No. 17/192,500 filed Mar. 4, 2021, which in turn is a continuation of Ser. No. 16/226,973 filed Dec. 20, 2018, which in turn claims priority on U.S. Provisional Patent Application Ser. No. 62/608,083 filed Dec. 20, 2017, which is incorporated herein.

FIELD OF THE INVENTION

The present invention relates to reactive composites that can be used to provide controlled generation of heat and/or pressure in situ to a wellbore, geologic formation, or other remote operations through interaction with water and/or some other or additional chemical present at the wellbore, geologic formation, or other remote operation location. The invention also relates to individual particles or agglomerates which have applied to their surface a second, discreet phase material having a different composition from the particle or agglomerate which 1) provides for at least partial control over the reaction with the core particle or agglomerate with the surrounding environment, and/or 2) may be tailored by controlling the relative particle sizes and/or amounts to provide a controlled reactivity rate. The invention also relates to the use of the non-explosive, targeted energy deposition materials to 1) activate downhole devices, such as a setting tool or mechanical perforation device, 2) enhance fracture conductivity by extending fractures, removing asphaltenes and/or paraffins or otherwise modifying the formation-fracture interfaces, and/or 3) clear debris and fines to restore flow by locally over-pressurizing a fracture.

BACKGROUND OF THE INVENTION

Hydraulic fracturing is a process of forcing a fracturing liquid under pressure into the reservoir to fracture subterranean shale rock or bedrock and introduce fissures or openings that allow energy-producing materials to be extracted and recovered. Hydraulic fracturing typically employs millions of gallons of water per well. Pressurized fracturing liquids may include various chemical modifiers that, when injected at high pressure into the open fissures in the bedrock, enhance the properties of the fracturing liquid and, in the case of unconventional hydrocarbon recovery systems, assist in the recovery of oil and gas when released from the shale rock or bedrock. Chemical modifiers such as petrochemicals, surfactants and macropolymers may be introduced in a fracturing fluid to modify the rheological properties of the bedrock or shale rock to promote fracturing of the bedrock, a process known as "stimulation". Chemical modifiers can modify or adjust the viscosity of the fracturing fluid, enhance performance of the fracturing fluid, or otherwise increase the accessibility of the fracturing fluid into the bedrock or shale rock. Fractures and fracture-induced fissures introduced into the bedrock are held open during or following the fracturing treatment by injecting a proppant such as sand, ceramics, or bauxite in the fracking fluid. The addition of proppants allows petroleum and hydrocarbon gases such as methane ($CH_4$) gas or other recovered energy-producing materials to diffuse or flow out of the fractures and fissures and into the reservoir for recovery.

Well-known problems exist with use of conventional fracturing fluids in fracking operations. For example, proppants including sand and other solid particulates degrade pumping components and piping over time, thereby reducing equipment lifetimes. Proppant particles can also constitute a high-volume fraction of the fracturing fluid that can adversely increase the density of the fracturing fluid. Highly viscous fluids or gels are often required to transport the dense proppants through the reservoir into the desired location in the bedrock. Dense and heavy proppants can cause excessive loads on injection pumps and increase costs for pumping. In addition, chemicals introduced in fracturing fluids can leach into aquifers and contaminate the ground water or deleteriously impact the environment where reservoirs are located. Other types of chemicals can be potentially carcinogenic or can include explosives or other high-energy compounds that themselves are problematic or otherwise require extreme or careful handling. Furthermore, fracturing fluids developed for oil/gas recovery may not be applicable for some wells since temperatures greater than 150° C. can degrade process chemicals. Also, injected chemical additives and drilling mud can also be physically difficult to remove from the bedrock formation once a new fracture front is formed, resulting in decreased flow rates and decreased heat transfer. Accordingly, new fracturing fluids, proppants, and processes are needed that enhance fracturing, permeability, and/or recovery of energy-producing materials at high temperature and high-pressure conditions.

A major problem with current stimulation treatments is an inability to address natural fractures, particularly fractures that are oblique to the primary fracture. Due to pumping losses and flow resistance, particularly with viscosified fluids needed to carry heavy proppants, driving forces into oblique fractures are rapidly reduced as the distance from the wellbore entrance increases. The reduction in driving forces leads to insufficient opening of fractures, especially in oblique fractures, to transport proppants into the far field fractures. Similarly, proppants generally travel through "drift" formations and cannot make the turn to oblique fractures, leaving such oblique fractures unpropped.

Wells are commonly stimulated in multiple zones, generally 20-50 or more zones per well. To stimulate each zone, each zone must be perforated (if a cased completion), isolated from other zones to allow pressure to be applied, and then stimulated. Devices that are used for zonal isolation and perforation include coiled tubing placements, sliding sleeves, or plug-n-perf methods using coiled tubing or wireline or slickline set tools. Limited setting force can be applied through the wireline, and each tool must be run down separately in order to apply such force. Explosively set tools can be used to resolve the limitation of running in each tool separately, thereby allowing tools to be set with minimum force from the surface. However, the use of explosives limits application worldwide, and creates significant safety and health issues for workers.

In view of the current state of the art of proppants, there is a need for improved proppants that address the current deficiencies.

SUMMARY OF THE INVENTION

The present invention relates to reactive composites that can be used to provide controlled generation of heat and/or pressure in situ to a wellbore, geologic formation, or other remote operations through interaction with water and/or some other or additional chemical present at the wellbore, geologic formation, or other remote operation location. The invention also or alternatively relates to reactive composites that include individual particles and/or agglomerates which have applied to their surface a second, discreet phase material of different composition from the particle which 1) provides for at least partial control over the reaction with the core particle or agglomerate with the surrounding environment, and/or 2) may be tailored by controlling the relative particle or agglomerate sizes and/or amounts to provide a controlled reactivity rate of the reactive composites. The invention also or alternatively relates to the use of the non-explosive, targeted energy reactive composites to 1) activate downhole devices, such as a setting tool or mechanical perforation device, 2) enhance fracture conductivity by extending fractures, 3) remove asphaltenes and/or paraffins or otherwise modifying the formation-fracture interfaces, and/or 4) clear debris and fines to restore flow by locally over-pressurizing a fracture. The present invention also or alternatively relates to the use of reactive composites and reactive composite-water dispersions to provide local heat and pressure during geothermal, mining, and oil and gas operations.

In one non-limiting aspect of the present invention, there is provided a reactive composite that contains a 1) reactive material (e.g., an alkali metal, metal hydride and/or alkaline earth metal) and 2) a polymer and/or inorganic material. The polymer and/or inorganic material may be a binder or coating. The reactive material is generally formulated to react with water and/or other type of oxidizer in a controlled manner to create localized heat and/or pressure. By using a reactive composite, the reaction rate and timing of the reaction of the reactive composite can be controlled.

The present invention encompasses the composition, design, and use of pumpable, time-delayed reactive composites that can add controlled local amounts of energy (temperature and/or pressure) to a wellbore, geologic formation, or other remote operations. Three mechanisms for use of the reactive composite in accordance with the present invention have been identified for exploratory development leading to the ability to deliver energy/force in situ in accordance with the present invention: 1) a reactive composite in the form of water-reactive materials such as alkali metals, alkaline metals and/or metal hydrides are coated to result in controlled release of temperature and/or pressure from the reactive composite, 2) a reactive composite in the form of a catalyzed fuel-oxidizer system wherein catalysts initiate a reaction with a ammonium nitrate pumpable oxidizer (essentially a pumpable version of ANFO blasting agents that can be deployed and activated 15,000 ft. down in a well), and 3) a reactive composite in the form of a nanothermite system with an initiator and control coating, such as, but not limited to, Mg—$Bi_2O_3$ or Mg-PTFE systems. These types of reactive composites include the use of a temperature- and/or chemically-soluble coatings or matrixes (e.g., PVA and/or PLGA, etc.) combined with a water-reactive fuel and/or solid (e.g., calcium, sodium, metal hydride, etc.) and optionally a solid acid catalyst (e.g., sodium bisulfate, etc.). The reactive composites are engineered to control the reactive material interaction with the formation and completion fluid, and to deliver a force in a controlled manner (e.g., to apply force a) locally, b) under controlled rates, and/or c) at a predetermined time or location). The targeted delivery of force caused by the reactive composites can be used to reduce costs and increase recovery through the development of improved fracture networks and fracture permeability, as well as to reduce the need for surface intervention, such as coiled tubing.

The reactive composites, when used as a mixture during stimulation, can be added to the sand or other proppant and placed in the fracture. Under a controlled time and/or condition (such as pH and/or temperature change), the reactive composites interact with the completion fluid (generally water) to cause gas and/or heat generation. The most common reactions caused by the reactive composites produce hydrogen and heat, but gas-forming additions (propellants) that generate other or additional types of gasses can also or alternatively be used. The local high pressure caused by the release of heat and/or gas formation by the reactive composites can be used to accelerate the fluid locally, thereby "blowing" proppants and fluids into the fine fractures in all directions. By adding the reactive composites to the well fluid and controlling the reactions of the reactive composites, the following types of activities can be completed by using the reactive composites in accordance with the present invention:

Proppant can be agitated and resuspended, eliminating drifting and enhancing transport;

Flows can be accelerated and pressure increased to overcome pumping frictional losses, and reduce the viscosity requirement for transporting proppants;

Very high local pressures can be generated in the well or formation, creating new fractures and opening and extending local fractures, such as those that are orthogonal to the main fracture, or in the far field, where current techniques have difficulty stimulating;

Fractures and flow can be diverted by controlling pressure gradients;

Local temperatures can be increased to enable gel-breaking in low temperature wells or formations;

Local temperatures can be increased to conduct cleanup activities such as paraffin or asphalt removal; and Local temperatures can be increased to create thermal microfissures or otherwise modify the surface of the formation at the fracture.

When the reactive composites are placed inside a chamber and mechanically linked, tools such as perforators, plugs, etc. can be actuated or set. Such tools include liner hangers (e.g., expandable), bridge and frac plugs, perforation devices, and other tools. The fluid can optionally be added in the chamber by a check valve or other controlled manner to give more precision over the tool activation and/or enable longer delays for placement of the tool in the well or formation.

These non-limiting examples for use of the reactive composites of the present invention are only a few of the activities or enhancements that can be used in well completion, stimulation, and workover/intervention activities using targeted energy delivery materials in accordance with the present invention.

The present invention also pertains to a method of stimulating a well or formation using force/energy reactive composites that are included in the completion fluid, and to a method of targeted delivery of well stimulation heat and pressure (as well as chemicals). The method in accordance with the present invention can be used to:

Overcome frictional losses to extend fractures further;

"Clean-up" wells or formations through heat and/or pressure delivery, such as by removing asphaltenes and paraffins, or by "blowing" debris and fines out into the wellbore or formation;

Deliver heat and/or pressure to specific regions of the well or formation to improve or extend fracture conductivity to improve resource recovery;

Control timing and location of the force/energy delivery by the reactive composites through engineered reactive composites that "respond" to the formation conditions of temperature, fluid, and distance (time); and Generate high pressures and/or temperatures locally in the well or formation to initiate new fracture and divert flow into secondary fracture networks during the stimulation process.

In one non-limiting embodiment of the present invention, there is the provision of a reactive composite that has been engineered to be a high strength reactive composite that is useful for oil and gas completions and well stimulation processes, enhanced oil and gas recovery operations, as well as in defensive and mining applications requiring high energy density and good mechanical properties.

In another and/or alternative non-limiting embodiment of the present invention, there is the provision of a reactive composite that includes a core material and a reactive binder matrix combined in controlled volumes and with controlled spacing and distribution to produce both high strength and controlled reactivity.

In another and/or alternative non-limiting embodiment of the present invention, there is the provision of a reactive composite that includes a repeating metal, ceramic, or composite particle core material and a reactive binder/matrix, and wherein the reactive/matrix binder is distributed relatively homogeneously around the core particles, and wherein the reactivity of the reactive binder/matrix is engineered by controlling the relative chemistry and interfacial surface area of the reactive composite to control the reactivity of the reactive composite.

In another and/or alternative non-limiting embodiment of the present invention, there is the provision of a method of manufacturing a reactive composite that includes the preparation of a plurality of engineered reactive building blocks and consolidating these building blocks below the liquidus of the binder or core material using a combination of heat and pressure, and using such techniques as powder forging or field-assisted sintering (e.g., spark plasma sintering) to retain the major distribution of the phases in the reactive composite.

In another and/or alternative non-limiting embodiment of the present invention, there is the provision of a reactive composite that includes 1) a reactive material and 2) a polymer and/or inorganic material. The reactive material includes an alkali metal, metal hydride and/or alkaline earth metal; the polymer and/or inorganic material is a binder and/or coating. The reactive material is formulated to react with water and/or another type of oxidizer in a controlled manner to create localized heat and/or gas generation.

In another and/or alternative non-limiting embodiment of the present invention, there is the provision of a reactive composite wherein the polymer and/or inorganic material at least partially forms an outer coating, and which outer coating includes a polymer material that is formulated to degrade/dissolve when exposed to a) a certain type of fluid, b) a certain temperature, c) a certain chemical, and/or d) a certain pH.

In another and/or alternative non-limiting embodiment of the present invention, there is the provision of a reactive composite that includes an outer coating and/or binder material that is at least partially formed of a polymer and/or inorganic material, wherein the polymer and/or inorganic material includes ethylcellulose, PVA and/or PLGA.

In another and/or alternative non-limiting embodiment of the present invention, there is the provision of a reactive composite that includes an outer coating and/or binder material that is at least partially formed of a polymer and/or inorganic material, wherein the polymer and/or inorganic material at least partially forms the binder, and wherein the reactive material is dispersed in the binder.

In another and/or alternative non-limiting embodiment of the present invention, there is the provision of a reactive composite that includes an outer coating and/or binder material that is at least partially formed of a polymer and/or inorganic material, wherein the binder includes PGA, $AlCl_3$, and/or sodium bisulfate.

In another and/or alternative non-limiting embodiment of the present invention, there is the provision of a reactive composite that includes an oxidizer formulated to react with the reactive material, and wherein the oxidizer includes PVDF, $KClO_4$, $C_3F_6$, $Fe_3O_4$, CuO, and/or $Bi_2O_3$.

In another and/or alternative non-limiting embodiment of the present invention, there is the provision of a reactive composite that includes an accelerant, wherein the accelerant includes gallium, nickel and/or acid.

In another and/or alternative non-limiting embodiment of the present invention, there is the provision of a reactive composite that includes a core, a reactive coating about the core, and an outer coating about the reactive coating, and wherein the core includes Mg—$Fe_2O_3$, Al—$Fe_2O_3$, Mg-PTFE, and/or Al-PTFE, wherein the outer coating is formulated to degrade/dissolve, and wherein the reactive coating is formulated to facilitate in triggering a reaction of the core after the outer coating has at least partially or fully degraded/dissolved.

In another and/or alternative non-limiting embodiment of the present invention, there is the provision of a reactive composite that includes a core and a reactive coating about the core, and wherein the reactive coating includes a water-reactive alkali metal, alkaline earth metal and/or metal hydride.

In another and/or alternative non-limiting embodiment of the present invention, there is the provision of a reactive composite that includes a core and a reactive coating about the core, and wherein the reactive coating includes calcium, sodium, metal hydride, and/or a solid acid catalyst.

In another and/or alternative non-limiting embodiment of the present invention, there is the provision of a reactive composite in the form of a fuel-oxidizer system, wherein the reactive composite includes a reactant (e.g., ammonium nitrate and/or magnesium, etc.), a fuel (e.g., diesel, gasoline, oil, fuel oil, natural gas, or other gas or liquid combustible petroleum product), and an outer coating, and wherein the outer coating includes a polymer material that is formulated to degrade/dissolve when exposed to a) a certain type of fluid, b) a certain temperature, c) a certain chemical, and/or d) to a certain pH.

In another and/or alternative non-limiting embodiment of the present invention, there is the provision of a reactive composite that includes a catalytic initiator material.

In another and/or alternative non-limiting embodiment of the present invention, there is the provision of a reactive composite that includes a core formed of magnesium alloy powder and binder, an outer coating formed about the core, and wherein the magnesium constitutes greater than 50 wt. % of the magnesium alloy powder, and wherein the magnesium alloy powder includes nickel, iron, carbon, copper, and/or cobalt, and wherein the magnesium alloy powder has an average particle size of 0.5-10 microns, and wherein the binder includes a polymer (e.g. PVA, etc.), and wherein the magnesium alloy is evenly dispersed in the binder, and wherein the outer coating includes a polymer (e.g., PVA, etc.) that is formulated to degrade/dissolve when exposed to a) a certain type of fluid, b) a certain temperature, c) a certain chemical, and/or d) to a certain pH.

In another and/or alternative non-limiting embodiment of the present invention, there is the provision of a reactive composite that is reactive in brine to generate local gas formation and energy release after a 10-60-minute delay at temperatures of 40-60° C.

In another and/or alternative non-limiting embodiment of the present invention, there is the provision of a reactive composite that includes a core of calcium metal that is dispersed in a PVA resin, and wherein the core is surrounded by an outer coating of PGA.

In another and/or alternative non-limiting embodiment of the present invention, there is the provision of a reactive composite that is reactive in brine to generate local gas formation and energy release after a 2-10 minute delay at temperatures of 40-60° C., and wherein the calcium metal core reacts in the brine for over a period of 5-30 minutes.

In another and/or alternative non-limiting embodiment of the present invention, there is the provision of a reactive composite that includes 40-90 vol. % magnesium powder, 10-60 vol. % carbonyl iron powder, 0.1-10 vol. % $AlCl_3$ solid acid, and PVA.

In another and/or alternative non-limiting embodiment of the present invention, there is the provision of a reactive composite that is reactive in brine to generate local gas formation and energy release at temperatures of 40-60° C. for a 2-60 minute period.

In another and/or alternative non-limiting embodiment of the present invention, there is the provision of a reactive composite that includes a core of calcium metal that is dispersed in an ethylcellulose binder, and wherein a polymer coats the outer surface of the core.

In another and/or alternative non-limiting embodiment of the present invention, there is the provision of a method for adding energy and/or gas to a well or geologic formation including (a) providing a wellbore fluid such as water, brine, an/or other fluid containing an oxidant; (b) providing reactive composites, the reactive composites including (i) a reactive material formulated to react with the wellbore fluid to generate heat and/or gas; (ii) a reactive material that at least partially forms a core and wherein a protective coating is positioned about the core, and wherein the core is fully formed of reactive material or is formed of reactive material, binder and optionally other materials, and wherein the core is optionally coated with a reactive coating, and wherein the protective coating or optional binder delays and/or inhibits the reaction of the reactive material with the wellbore fluid; and, wherein the reactive composites optionally contain an oxide and/or oxidizer (e.g., $KClO_4$, $Bi_2O_3$, PVDF, PTFE, etc.), other thermitic or oxidizing material, a catalyst and/or a dopant to accelerate or otherwise control a reaction of the reactive composite with the wellbore fluid; (c) placing the reactive composites in a constrained location in the wellbore or geologic formation wherein additional pressure and/or heat is desired; and, (d) causing the reactive composites to react with the wellbore fluid to generate local heat and/or gas pressure at the constrained location.

In another and/or alternative non-limiting embodiment of the present invention, there is the provision of a method for adding energy and/or gas to a well or geologic formation by placing reactive composites in the well or geologic formation by adding the reactive composites to the wellbore fluid and then pumping the wellbore fluid into the well or geologic formation and/or pumping the reactive composites into the wellbore or geologic formation, and wherein the binder and/or outer coating on the reactive composites control a timing of reaction of the reactive material of the reactive composites with the wellbore fluid.

In another and/or alternative non-limiting embodiment of the present invention, there is the provision of a method for adding energy and/or gas to a well or geologic formation wherein the reactive composites are added to a non-reactive fluid such as diesel fuel, $N_2$, natural gas, and/or other non-reactive fluid, then placing the reactive composites at the constrained location in the well or geologic formation.

In another and/or alternative non-limiting embodiment of the present invention, there is the provision of a method for adding energy and/or gas to a well or geologic formation wherein the non-reactive fluid and the reactive composites are injected or pulsed into the wellbore fluid during a pumping operation.

In another and/or alternative non-limiting embodiment of the present invention, there is the provision of a method for adding energy and/or gas to a well or geologic formation wherein the reactive material in the reactive composites includes one or more of magnesium, calcium, lithium, sodium, potassium, cesium, iron, aluminum, boron, zinc, nickel, cobalt, tungsten, titanium, zirconium, and/or their hydrides, amines, and borohydrides.

In another and/or alternative non-limiting embodiment of the present invention, there is the provision of a method for adding energy and/or gas to a well or geologic formation wherein the reactive metal in the reactive composites includes magnesium and/or aluminum.

In another and/or alternative non-limiting embodiment of the present invention, there is the provision of a method for adding energy and/or gas to a well or geologic formation wherein the reactive composites include a galvanically-active dopant selected from one or more of nickel, iron, cobalt, gallium, indium, or their compounds.

In another and/or alternative non-limiting embodiment of the present invention, there is the provision of a method for adding energy and/or gas to a well or geologic formation wherein the reactive material in the reactive composites has an average particle size of 0.1-100 microns.

In another and/or alternative non-limiting embodiment of the present invention, there is the provision of a method for adding energy and/or gas to a well or geologic formation wherein the binder or coating used to at least partially form the reactive composites is selected from one or more of ethylcellulose, PVA, PGA, PLA, PLGA, or other hydrolysable or water-soluble polymeric material.

In another and/or alternative non-limiting embodiment of the present invention, there is the provision of a method for adding energy and/or gas to a well or geologic formation wherein the binder or coating used to at least partially form the reactive composites is selected from a controlled solubility inorganic material such as $CaCO_3$, $CaOH_3$, and/or other hydroxide, and/or carbonate material.

In another and/or alternative non-limiting embodiment of the present invention, there is the provision of a method for adding energy and/or gas to a well or geologic formation wherein the reactive composites are coated on an inorganic particle (e.g., sand, bauxite, aluminosilicate, dolomite, or other inorganic particle) and positioning the coated inorganic particles at the constrained location in a well or other geologic formation.

In another and/or alternative non-limiting embodiment of the present invention, there is the provision of a method for adding energy and/or gas to a well or geologic formation wherein the reactive composites are added as a thermal initiator to a propellant, thermitic, or reactive composite core particle or subcoating.

In another and/or alternative non-limiting embodiment of the present invention, there is the provision of a method for adding energy and/or gas to a well or geologic formation wherein the reactive composites are used to open and extend fractures in a water, geothermal, or oil and gas well or formation.

In another and/or alternative non-limiting embodiment of the present invention, there is the provision of a method for adding energy and/or gas to a well or geologic formation wherein the reactive composites are placed inside a container and used to generate local pressure or force in the container so as to activate a tool (e.g., a setting tool, a bridge plug, a frac plug, a perforation device, a sleeve, a valve, a packer, etc.) that includes or is associated with the container.

In another and/or alternative non-limiting embodiment of the present invention, there is the provision of a method for adding energy and/or gas to a well or geologic formation wherein an added chemical (e.g., a solid acid, etc.) is added to the constrained location in the well or geologic formation, and wherein the added chemical is formulated to at least partially neutralize reaction byproducts or otherwise change a local environment of the constrained location before, during, or after the reaction of the reactive composites in the constrained location.

In another and/or alternative non-limiting embodiment of the present invention, there is the provision of a method for adding energy and/or gas to a well or geologic formation that includes (a) creating reactive composites that contains a water- or fluid-reactive material and an outer coating and/or binder that controls contact or exposure of the reactive material to the water or fluid; (b) placing the reactive composites into the well or geologic formation by pumping the reactive composites with a fluid into the well or geologic formation; and, (c) reacting the reactive composites with wellbore or formation fluid to create heat and/or pressure in the well or formation.

In another and/or alternative non-limiting embodiment of the present invention, there is the provision of a method for adding energy and/or gas to a well or geologic formation wherein the reactive composites are blended with some or all of the wellbore fluid, and also optionally with sand or other proppant at an addition rate of 0.1-10 lbs./gallon of wellbore fluid.

In another and/or alternative non-limiting embodiment of the present invention, there is the provision of a method for adding energy and/or gas to a well or geologic formation wherein the reactive composites are premixed with a second fluid and pulsed or periodically added to the wellbore fluid during stimulation treatment of the well or geologic formation.

In another and/or alternative non-limiting embodiment of the present invention, there is the provision of a method for adding energy and/or gas to a well or geologic formation wherein the reactive composites cause fluidization of proppant during reaction of the reactive composites to reduce or prevent dune formation by the proppant in the well or geologic formation and/or to cause the proppant to be transported further into a far field of a fracture network in the well or geologic formation.

In another and/or alternative non-limiting embodiment of the present invention, there is the provision of a method for adding energy and/or gas to a well or geologic formation wherein the reactive composites create enhanced local pressure in the well or geologic formation during reaction of the reactive composites so as to create additional fracture length in the well or formation, and/or to enhance or otherwise move proppant into oblique or finer fractures in the well or geologic formation.

In another and/or alternative non-limiting embodiment of the present invention, there is the provision of a method for adding energy and/or gas to a well or geologic formation wherein the core of the reactive composites has an average diameter of 0.1-1000 microns.

In another and/or alternative non-limiting embodiment of the present invention, there is the provision of a method for adding energy and/or gas to a well or geologic formation wherein the reactive composites have an outer coating, and wherein a thickness of the outer coating is 0.01-50 microns.

In another and/or alternative non-limiting embodiment of the present invention, there is the provision of a method for adding energy and/or gas to a well or geologic formation wherein the reactive composites have an average particle size of 10-300 microns.

BRIEF DESCRIPTION OF THE DRAWINGS

Referring particularly to the drawings for the purposes of illustration only and not for purposes of limited the scope of the invention.

DESCRIPTION OF NON-LIMITING EMBODIMENTS OF THE INVENTION

Figure 1:
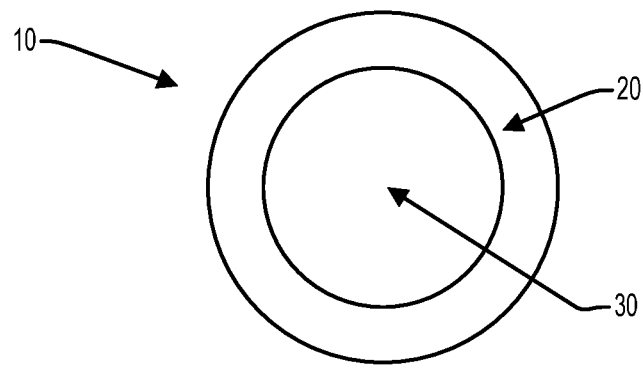
FIG. 1 illustrates a reactive composite having a reactive core with an outer coating on the outer surface of the reactive core, wherein the outer coating is used to control the activation/reaction of the reactive core.

The present invention pertains to a reactive composite that can be time- and/or chemically-triggered to cause a reaction which can result in generating heat (exothermic reaction) and/or pressure about the reactive composite to improve resource recovery and reduce water usage in wells and other geologic formations. These reactive composites can include a) dispersions of energetic particles with proppant particles, and/or b) coated proppant particles with time-delayed, soluble, and/or energetic coatings and/or binders. The present invention also pertains to methods of 1) controlling the microstructure, chemistry, particle size, coating thickness or active ingredient concentration in the reactive composites, and/or 2) triggering thermites and propellant particles to vary the reaction time from a long sustained thermal release to a near instantaneous pressure release in a well or formation.

In one non-limiting embodiment, reactive composites that are formed of an alkali metal, alkaline metal and/or water-reactive solids that are dispersed in a water-soluble binder (e.g., ethylcellulose, PVA, PLGA, etc.) can be placed in or pumped into a well so as to cause heat/pressure generation in the well or formation. The alkali and/or alkaline metals are selected to react rapidly with water, thereby releasing substantial amounts of heat and/or $H_2$ gas when exposed to water or wellbore fluids. Calculations indicate that pressure generation of up to 20,000 psig is theoretically obtainable (lithium reaction with water) in stoichiometric metal-water reactions. Table 1 summarizes the theoretical gas generation, pressure (at STP), and thermal release that can be generated by alkali and alkaline metal-water reactions.

TABLE 1

STP Pressures and approximate temperatures achieved in stoichiometric Metal-water reactions

| reaction | $H_2$ gas moles/cc | $H_2$ pressure STP | energy release KJ/mole | energy release KJ/cc | $H_2O$ temp rise | cost $/lb |
|---|---|---|---|---|---|---|
| $2Li + 2H_2O = 2LiOH + H_2$ | 0.069 | 22,720 | 222 | 30.6 | 6801 | 30 |
| $2Na + 2H_2O = 2NaOH + H_2$ | 0.027 | 8,890 | 184 | 9.99 | 2220 | 3 |
| $2K + 2H_2O = 2KOH + H_2$ | 0.01 | 3,292 | 196 | 4.01 | 890 | 40 |
| $2Cs + 2H_2O = 2CsOH + H_2$ | 0.006 | 1,975 | 203 | 2.63 | 585 | 300 |
| $Ca + 2H_2O = Ca(OH)_2 + H_2$ | 0.0314 | 10,327 | 430 | 13.49 | 2998 | 2 |
| $Ba + 2H_2O = Ba(OH)_2 + H_2$ | 0.0237 | 7,808 | 430 | 10.19 | 2265 | 45 |
| $Al + 3H_2O = Al(OH)_3 + 3/2H_2$ | 0.0377 | 12,427 | 340 | 12.83 | 2851 | 1 |
| $Mg + 2H_2O = Mg(OH)_2 + H_2$ | 0.0283 | 9,328 | 360 | 10.163 | 2258 | 2 |

From Table 1, lithium is energetically most favorable, while sodium, calcium, magnesium, and aluminum are also very attractive in generating high temperatures and pressures through reaction with water, and in terms of cost. Lithium, sodium, and calcium react with warm water quickly, while aluminum and magnesium typically need accelerants (gallium, nickel respectively, or acid) and high surface area to react at appreciable rates. With practical loadings in timed-delayed matrices or coatings being 50-75%, these still represent very viable reactions for targeted energy and pressure delivery in a well or formation.

Energy release and/or reaction rate of the reactive composite can be accelerated by addition of stronger oxidizers than water. Potential oxidation reactions are illustrated in Table 2, which are categorized into oxidation and thermite reactions. Some reactions, specifically the aluminum PTFE reaction, have significant gas generation, which can significantly increase the pressure in a well or formation. For example, a slightly over stoichiometric reaction of Al+PTFE will generate almost 4 m$^3$ of gas and a 50% composition in a 50% by volume water slurry can give upwards of 7 m$^3$/kg.

TABLE 2

Representative candidate Oxidation Reactions

| Reaction | Density of Material's Reacting | Energy Release Cal/g |
|---|---|---|
| $2.667Al + KClO_4 \rightarrow 1.333Al_2O_3 + KCl$ | 2.1 | 2563.4 |
| $2nAl + (C_3F_6)_n \rightarrow 2n\ AlF_{3(s)} + 3n\ C$ "Teflon" | 1.4 | 2600 |
| $4Mg + KClO_4 \rightarrow 4MgO + KCl$ | 1.8 | 2462.3 |

TABLE 3

Representative Thermite Type Reactions

| Reaction | Density of Material's Reacting | Energy Release Cal/g |
|---|---|---|
| $3Fe_3O_4 + 8Al \rightarrow 9Fe + 4Al_2O_3 + heat$ | 3.7 | 1053 |
| $2Al + 3CuO \rightarrow Al_2O_3 + 3Cu$ | 2.54 | 1253 |
| $Mg + CuO \rightarrow MgO + Cu$ | 3.9 | 1026.5 |
| $3Mg + Bi_2O_3 \rightarrow 3MgO + 2Bi$ | 5.7 | 543.3 |

Controlled Reaction Technology by Use of Coatings

Specific compositions, reaction mechanisms, and coating thickness for the reactive composite can be used in accordance with the present invention. Time-delay mechanisms can be used wherein the outermost coating will slowly or controllably dissolve in water, frac water, etc., thereby exposing a water-reactive layer or core that will ignite the reactive material in the core. In one non-limiting embodiment, the reactive core of a reactive composite can be formed of reactive metal particles dispersed in a degradable polymer bead, and the degradable polymer bead can be coated with a delay coating. By controlling particle size of the reactive metal particles in the core, degradation rate of the polymer used to form the degradable polymer bead, and the composition and coating thickness of the delay coating, control over the energy release time and/or rate of the reactive composite can be achieved. Accelerants, such as encapsulated bisulfate solid acid, can be optionally compounded in the reactive composite to accelerate or enhance reaction rates (e.g., for magnesium) in the core.

A coating that can only be triggered by an external stimulus (e.g., pH change, temperature change, fluid composition change, electrical stimulation, etc.) can be used in the reactive composite to facilitate in the activation/reaction of the reactive materials in the core of the reactive composite. Reactive or combustive fluids (e.g., H$_2$ gas, propane gas, liquid propane, diesel fuel, LN$_2$, etc.) can be used in combination with the reactive material in the core of the reactive composite. The reactive composites can be isolated from water and/or brine or other fluids that will react with the reactive composite during the placement of the reactive composite in a well, formation, etc., thereby potentially eliminating the need for an outer coating on the reactive composite.

FIGS. 1-10 illustrate several non-limiting examples of reactive composites in accordance with the present invention.

FIG. 1 illustrates a reactive composite 10 having a reactive core 30 with an outer coating 20 on the surface. The outer coating 20 is used to control the activation of the reactive core 30. The outer coating 20 can be formulated to degrade/dissolve when exposed to a) a certain type of fluid (e.g., water, brine, etc.), b) a certain temperature, c) a certain chemical, d) a certain pressure, and/or e) a certain pH. The composition and thickness of the outer coating 20 is used to control when the reactive core 30 is activated and/or reacts with the surrounding fluid in the well or formation. The reactive core 30 can be or include a water-reactive alkali metal and/or metal hydride. The reactive core 30 can be formulated to cause a thermal and/or deflagration reaction. The reactive core 30 can also or alternatively be formulated to cause gas formation during the reaction of the reactive core 30.

Figure 2:
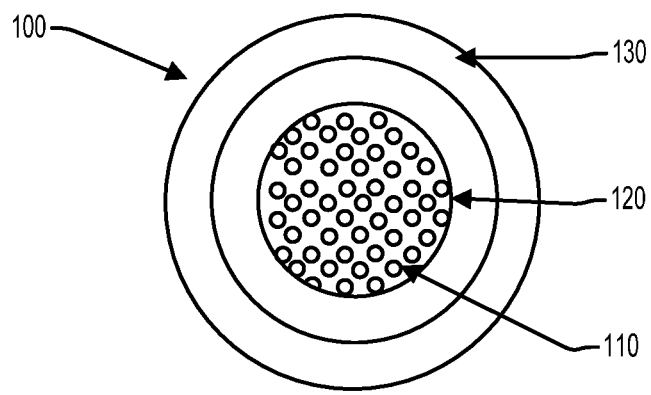
FIG. 2 illustrates a reactive composite having a reactive composite core or reactive thermite core, and wherein the reactive composite core or reactive thermite core is coated with a trigger coating, and wherein the trigger coating is coated with an outer coating, wherein the outer coating is used to control the activation/reaction of the trigger coating and/or the reactive composite core or reactive thermite core.

FIG. 2 illustrates a reactive composite 100 having a reactive composite core or reactive thermite core 110 with an inner coating 120 (e.g., thermal trigger coating) and an outer coating 130. The outer coating 130 can be formulated to degrade/dissolve at a certain temperature and/or when exposed to a certain chemical and/or exposed to a certain pH. The outer coating 130 can be the same or similar to the outer coating of FIG. 1. The inner coating 120 can be or include a water-reactive alkali metal and/or metal hydride that is used to facilitate in triggering the reaction of the core 110. The core 110 can be the same or similar to the core 30 of FIG. 1. The core 110 can optionally be or include Mg—Fe$_2$O$_3$, Mg-PTFE (Mg-polytetrafluoroethene) or Al-PTFE (Al-polytetrafluoroethene).

Figure 3:
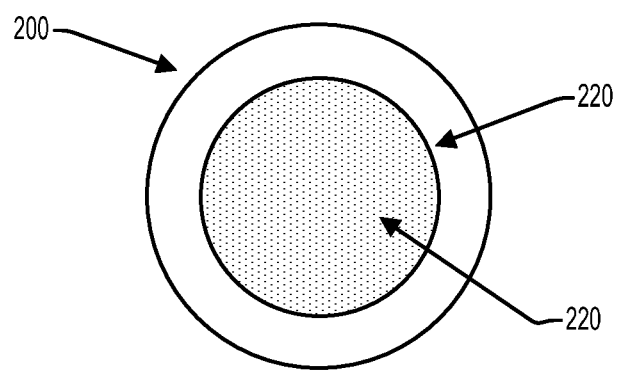
FIG. 3 illustrates a reactive composite having a core that is formed of a plurality of materials that include fuel, oxidizer and/or catalyst, and an outer coating on the outer surface of the reactive core, wherein the outer coating is used to control the activation/reaction of the reactive core, and wherein the plurality of materials that form the core can be in liquid, gas and/or solid form.

FIG. 3 illustrates a reactive composite 200 having a core 210 and an outer coating 220. The core 210 includes a binary reactive material in which reactive or combustive fluids, oxidizer and/or catalyst are in separate particles in the core 210. The core 210 can be or include sodium bisulfite acid.

Figure 4:
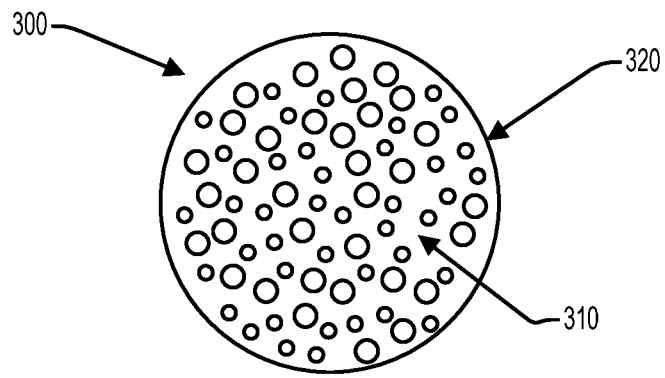
FIG. 4 illustrates a reactive composite having a core that is formed of a plurality of materials that include fuel, oxidizer and/or catalyst in a solid form, and optionally a binder can be used to at least partially form the core, and wherein the fuel and oxidizer and optional catalyst are in separate particles, and wherein an outer coating can be optionally included on the outer surface of the reactive core, wherein the optional outer coating is used to control the activation/reaction of the reactive core.

FIG. 4 illustrates a reactive composite 300 having a core 310 and an outer coating 320. The core 310 is formed of another type of binary reactive material in which the reactive or combustive fluids, oxidizer and/or catalyst are in separate particles. The outer coating 320 can be the same or similar to the outer coating 20 of FIG. 1. The core 310 can be or include nitroaniline and magnesium.

Figure 5:
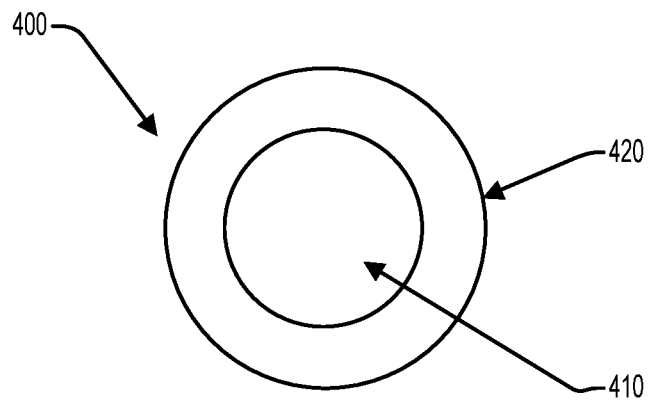
FIG. 5 illustrates a reactive composite having a fuel reactive core, and an outer coating about the core, wherein the fuel is a solid, liquid and/or gas fuel (e.g., oil, diesel, propane, diesel fuel, or $LN_2$, etc.), and wherein said outer coating is or includes a catalyst or trigger chemical initiator that causes the reaction of the core, and wherein the outer coating is formulated to be pumpable within a wellbore fluid into a well or geologic formation and to not cause the core to react until the reactive composite is located in a desired location in the well or formation.

FIG. 5 illustrates a reactive composite 400 having a fuel reactive core 410 and a coating 420 about the core 410. The coating 420 can be a pumpable catalyst or trigger chemical initiator that is used to activate and/or react with the core. An outer coating (not shown) such as a hydrophilic coating can be coated about coating 420. The core 410 can include an explosive material of reactive material and a reactive or combustive fluid to form a composite core (e.g., ammonium nitrate and diesel, magnesium and diesel) to allow the explosive material in the reactive composite to be pumped into a well or other subterranean location. The outer coating (not shown) can be formulated to degrade/dissolve at a certain temperature and/or when exposed to a certain chemical and/or exposed to a certain pH.

Figure 6:
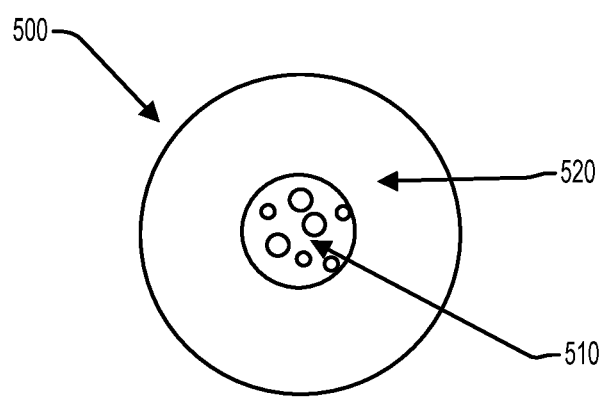
FIG. 6 illustrates a reactive composite having another type of fuel reactive core and pumpable catalyst or trigger chemical initiator about the core, wherein the core is formed of a plurality of different materials.

FIG. 6 illustrates a reactive composite 500 having another type of fuel-reactive core 510 and a coating 520 about the core 510. The coating 520 can be a pumpable catalyst or trigger chemical initiator that is used to activate and/or react with the core. An outer coating (not shown) such as a hydrophilic coating can be coated about coating 520. The coating 520 can be the same as illustrated in FIG. 5 or be or include a catalytic initiator material (acid catalyzed acid, etc.). The core 510 can be or include ANFO (ammonium nitrate, fuel oil). The outer coating (not shown) can be formulated to degrade/dissolve at a certain temperature and/or when exposed to a certain chemical and/or exposed to a certain pH.

Figure 7:
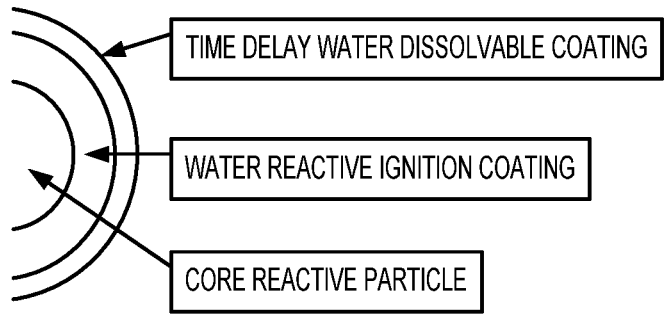
FIG. 7 illustrates a reactive composite formed of an outer dissolvable/degradable coating that is coated about a reactive coating material, and wherein the reactive coating material is coated about the reactive core material or core particle (which can be formed of one or more materials).

FIG. 7 illustrates a reactive composite formed of an outer dissolvable/degradable coating that is coated onto a reactive material (e.g., water-reactive material, etc.), and wherein the reactive material is coated onto a reactive composite core (e.g., Mg-PVDF, propellant such as Al—$KClO_4$, etc.).

Figure 8:
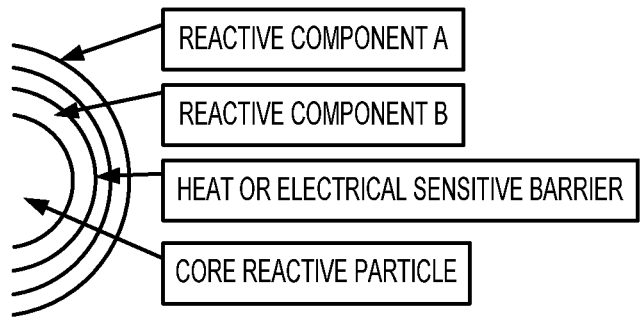
FIG. 8 illustrates a reactive composite in the form of a binary system that has a two-component trigger (or reaction), where the material separating the reactives can be breached or broken down by a thermal, electrical, or other trigger, wherein the core reactive particle (which can be formed of one or more materials), is coated with a reactive component B, and wherein reactive component B is coated with a heat- or electrically-sensitive barrier and reacts and/or degrades when exposed to a certain temperature or to an electrical charge, and wherein the heat- or electrically-sensitive barrier is coated with a reactive component A, and wherein reactive components A and B can have the same or different composition.

FIG. 8 illustrates a reactive composite in the form of a binary system that has a two-component trigger (or reaction), where the material separating the reactive components can be breached or broken down by a thermal, electrical, or other trigger. The core of the reactive composite can be a reactive composite core (e.g., Mg-PVDF, propellant such as Al—$KClO_4$, etc.). A reactive component B is coated on the outer surface of the reactive composite core. A heat-, water-, pH-, chemical- or electrical-sensitive coating is coated on the outer surface of reactive component B. Reactive component A is coated on the outer surface of the heat-, water-, pH-, chemical- or electrical-sensitive coating. The reactive component A is formulated to react when exposed to certain triggers (heat, pH, liquid composition, etc.). The reaction of component A causes heat generation, an electrical charge, chemical release, etc. which in turn causes the heat-, water-, pH-, chemical- or electrical-sensitive coating to begin dissolving/degrading. Once the heat-, water-, pH-, chemical- or electrical-sensitive coating has sufficiently dissolved/degraded, reactive component B is formulated to react when exposed to certain triggers (heat, pH, liquid composition, etc.). The reaction of component B causes heat generation, electrical charge, chemical release, etc. which in turn causes the reactive core to react to thereby generate gas and/or heat.

Figure 9:
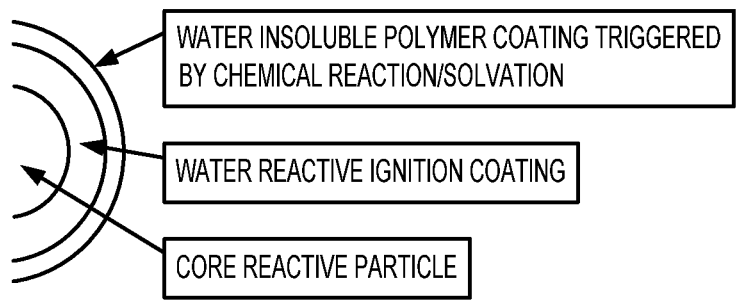
FIG. 9 illustrates a reactive composite comprised of a core formed of a reactive material, and wherein the core is coated with a water reactive ignition coating that is used to cause the reaction of the core, and wherein an outer coating is formed of a dissolvable/degradable coating that dissolves/degrades when exposed to a certain pH, temperature or chemical.

FIG. 9 illustrates a reactive composite similar to the reactive composite of FIG. 7, but the outer coating is a dissolvable/degradable coating that dissolves/degrades when exposed to a certain pH, temperature or chemical (e.g., enteric coating, etc.).

Figure 10:
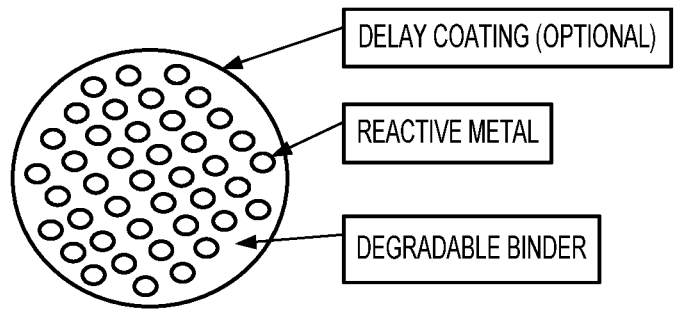
FIG. 10 illustrates a reactive composite comprised of a core formed of a reactive metal that is distributed in a dissolvable/degradable binder, and wherein the core is optionally coated with a dissolvable/degradable outer coating, and wherein the outer coating is formed of a dissolvable/degradable coating that dissolves/degrades when exposed to a certain pH, temperature or chemical.

FIG. 10 illustrates a reactive composite comprised of core formed of a reactive metal that is distributed in a dissolvable/degradable binder, and wherein the core is optionally coated with a dissolvable/degradable coating. The composition of the dissolvable/degradable coating (when used) is generally a different composition from the dissolvable/degradable binder; however, this is not required. An alternative to the use of the outer coating is to add the reactive composite with an unreactive fluid (e.g., diesel fuel, natural gas, or even $CO_2$), or unreactive fluid slug or dispersion and then to insert such mixture into a well or formation. The unreactive fluid functions similar to the use of an outer coating in that the unreactive fluid forms a temporary barrier about the reactive composite to prevent the reactive material in the reactive composite from reacting with water or other type of oxidizing in the fluid in the well or formation until the reactive composite has been positioned in a desired location in the well or formation. It can be appreciated that electrically-conductive coatings can be optionally used on the reactive composite, and RF or AC or DC electrical fields can be used to initiate the reactions on the reactive composite.

The outer coating on a reactive composite that is used to delay the reaction of the core of the reactive composite can include fluorinated polymers and ethyl cellulose. The use of these types of coating materials can be combined with other controlled-dissolution chemistries to enable the targeted release/delivery of catalytic (e.g., acid) or reactive (e.g., alkali metal hydride) active materials to initiate energy release in situ from the reactive composite. These formulations rely on the fact that the temperature in the formation is greater than during pumping, and that a temperature rise can be a triggering event to control dissolution of the protective coating about the reactive composite.

In accordance with the present invention, the formation of the reactive composites can be accomplished by applying about the reactive core of the reactive composite either a single layer of a polymer, organic, or inorganic material coating, and/or a multi-layer or composite coating system. The reactive core of the reactive composite can be formed only by reactive materials, reactive materials dispersed in a polymer binder material, or by compounding of the reactive material with an inorganic, organic, or polymeric binder. Overall reactive composite size, the size of the reactive materials can be selected so that the reactive composite can be formed by extrusion or pelletizing.

The outer coating composition and thickness can be selected to delay time of reaction of the reactive material. Typically, the outer coating is at least about 1% of the reactive composite diameter, typically no more than about 50% reactive composite diameter (e.g., 1%, 1.01%, 1.02% . . . 49.98%, 49.99%, 50%) and any value or range therebetween, and typically about 5-20% of the reactive composite diameter. Also or alternatively, the outer coating is at least about 1 microns thick, typically no more than about 1000 microns thick (e.g., 1 microns, 10 microns, 50 microns 100 microns, 500 microns, 1000 microns, and any value or range therebetween), and more typically about 0.01-0.5 mm thick. In one non-limiting embodiment of the invention, the reactive composite can be of a shape such as a rod or football to facilitate transport and placement or to reduce fabrication cost.

In one non-limiting embodiment of the invention, the reactive composites include reactive materials such as aluminum, magnesium, sodium, calcium, lithium, or their hydride, borohydride, or alginate compounds having an average particle diameter size of about 1-50 microns (e.g., 1 micron, 5 microns, 5.01 microns, 5.02 microns . . . 49.98 microns, 49.99 microns, 50 microns) and any value or range therebetween. The reactive materials can be surface coated before compounding or pelletized with a binder. A broad or narrow particle size of the reactive material may be utilized to help control costs, reaction rates, and concentrations of the reactive composite. In another non-limiting embodiment, larger particles of reactive material can be coated directly with thicker or thinner coatings. Typically, reactive materials having a particle size of 0.1-1 mm are coated with delay or trigger coatings. As can be appreciated, multi-layer coatings can be applied to the reactive materials or reactive composite.

In another non-limiting embodiment, the reactive core used in the reactive composites can include galvanically-active or other catalytic compounds, such as nickel, copper, cobalt, iron, additions to magnesium, gallium and/or indium additions to aluminum to facilitate their reaction. An acid-producing binder such as polyglycolic acid (PGA) or solid acid additions such as $AlCl_3$ or sodium bisulfate can optionally be added to the reactive composite to neutralize hydroxide byproducts, modify local pH and reaction rates, and to generate additional energy.

In a further non-limiting embodiment, the reactivity of an electrolytically-activated reactive material of magnesium, aluminum, and/or zinc and iron in the reactive composites can be controlled to produce hydrogen and heat at a controlled or accelerated rate by controlling the relative phase amounts and interfacial surface area of the galvanically-active phases.

As another non-limiting embodiment, the reactive composites can be placed into microcapsules with an oil or other organic liquid. The reactive composites may also be coated onto sand or other proppant material.

The reactive composites or beads or microcapsules that include the reactive composite can be placed in the well by mixing with a completion fluid (water, brine, etc.). The reactive composite can be added continuously, in slugs, or as a separate column, such as by blending with an unreactive fluid (e.g., diesel fuel, natural gas, liquefied natural gas, $CO_2$) and injecting the reactive composite as a slug into the well or formation. The addition of the reactive composite to the well or formation can be uniform, or can be added as periodic additions at one or more sequences during the stimulation operation of the well or formation.

The reactive composites, during the reaction of the reactive composite, can provide fluidization in the well or formation during the proppant transport process, thereby creating local turbulent flow through gas generation and preventing dune formation of the proppant, and/or causing refluidization of proppants by "blowing up" proppant drifts or dunes in the main fractures of the well or formation.

The reactive composites, during the reaction of the reactive composite, can enhance transport of proppants in the well or formation by creating local pressure in the well or formation to cause diversion from a main channel into secondary channels in the well or formation, and/or by creating backpressure in the well or formation that forces stimulation treatments into side channels or secondary channels in the well or formation. The creation of backpressure in the well or formation can be enhanced by adding the reactive composites immediately after the addition of a diverting or diversion agent into the well or formation, or after adding an increased viscosifier into the well or formation; however, this is not required.

The reactive composites can be added in an amount to create a local temperature rise of 10-50° C. in the well or formation to activate or otherwise cause gelbreaking in the well or formation after well completion to clear unwanted materials from the well or formation; however, this is not required.

The reactive composites can be engineered to provide a delay of minutes to several hours before the reactive material reacts after being added to the well and formation so as to provide the desired energy release (e.g., heat release and/or pressure increase due to gas production). Due to the heat generation during the reaction of the reactive material of the reactive composite, a propagating reaction can occur, releasing more than 50% of the total energy of the reactive composite in the first 30 seconds to five minutes after activation of the reactive material; however, energy release can be caused to occur at a slower rate by adding thicker delay coatings or lower concentrations of reactive material so that 50% of the total energy of the reactive composite occurs for five minutes to an hour or more.

Reaction times of the reactive material in the reactive composite may also be controlled by the type of reactive material used in the reactive composite and the particle size of the reactive material. In general, $Cs>Na>Ca>Mg>Al>Zn>Fe$ represent the rank in energy release of different reactive materials, and larger particles of reactive materials react more slowly than smaller particles. Nanoparticles of reactive materials can be made to react nearly instantaneously upon exposure/release to water or other oxidizer; however, this is not required.

The wellbore fluid is typically freshwater, brackish water, or brine, and can have a pH from 1 to 8. It is not atypical to pump the stimulation fluid into the well or formation at one pH with controlled additives to alter the pH for gelbreaking. Typically, a basic condition is used for viscosification, followed by an acid treatment to break the gel. Boric acid additions are typically used as gelbreakers. In other arrangements, such as for carbonate formations, the stimulation fluid can be pumped as a relatively strong acid, wherein it reacts with the formation and neutralizes the components in the formation as it reacts with the formation. Additions of reactive components, such as nitrate, or adjustment of pH can be completed through liquid or solid additions to the stimulation fluid. This change in pH can be used to activate or help control the timing of the reaction of the reactive composite in the well or formation—such as through enteric coatings, pH instable materials (e.g., hydroxides or carbonate binders/coatings). Many water-reactive coatings on the reactive composites can be selected to react with water to form hydrogen gas and a basic hydroxide, which can be neutralized or needs to be offset by additional acid or gelbreaker concentrations in the fluid or added to the reactive material.

Generally, the reactive composite of the present invention is added directly to the completion or stimulation fluid, but may also be added to an organic or inert gas or liquid and preplaced, foamed, or pulsed/slugged (slugs of fluid that contain the reactive composite are intermittently added to the completion fluid) with the stimulation fluid. Various techniques can be used in the fluid mixing and pumping to help control placement of the reactive composite and/or to modify its exposure to the wellbore and fluid conditions.

When pumping the reactive composite into a well or formation, the well is initially at the formation temperature, but is rapidly cooled during pumping of the stimulation fluid into the well or formation. As such, it can take several days or weeks for the fractures to return to the original formation temperatures. This temperature difference can be used to control activation of the reactive composite—such as by PVA or PGA coatings that degrade or become soluble only above certain temperatures. As such, a stimulation fluid or completion fluid can be added to the formation at a temperature that is below the formation temperature and below the activation temperature of the outer coating on the reactive composite. The outer coating composition is selected such that the coating composition will begin to degrade or dissolve in the stimulation fluid or completion fluid at a temperature that between the temperature of the stimulation fluid or completion fluid that was pumped into the well or formation and the original formation temperature. After the reactive composite has been placed in the well or formation at the lower temperature and the flow of stimulation fluid or completion fluid into the well or formation is stopped, the temperature of the formation begins to increase. The increase in temperature of the formation and fluid in the formation will increase to a point wherein the outer coating degrades or dissolves to a point that the reactive material reacts with the fluid in the well or formation.

In another non-limiting embodiment, the reactive composite can be used to generate pressure inside of a container. By placing the reactive composite inside a chamber or container, and then allowing controlled flow of a fluid into the chamber or container (e.g., such as through breaking an ampule in a pressure-equalizing system, through a pressure-activated or electrically-activated check valve, etc.), the pressure generated inside the chamber or container from the reaction of the reactive material of the reactive composite with the fluid that has flossed into the chamber or container can be used to perform an action (e.g., such as moving a sleeve or piston, setting a tool, forcing a perforator through a casing, or other action) in a well or formation or in some other application. One non-limiting application could be to force a cone through an expandable metal ring to cause a liner hanger in a well or formation to set against a formation or casing feature. In this manner, fluid-reactive or fluid-activated reactive composites can replace electrically-initiated explosives to perform all of the functions of the previously used explosives in a well or formation.

In another non-limiting application, the reactive composite may be placed or enclosed between two packers and used to stimulate a zone by providing a very high pressure pulse due to the reaction of the reactive material of the reactive composite. Once water or some other reactive fluid is pumped into the reactive zone, high pressures are generated due to the reaction of the reactive material of the reactive composite which can drive perforations, penetrators, and even create fractures in the well or formation. The reactive composites can generate up to 8-10 liters of gas (STP) per ml. of volume, which can be used as a propellant or driver for tool that are used in a well or formation.

The reactive composite can be added to a perforation device, such as a coating to the copper or other liner material, or as a slug positioned on the top or inside of the perforator cone or perforation device. The perforation jet or penetrator can be used to carry the reactive composite along with it and, once the reactive material in the reactive composite is exposed to the formation fluids, the reactive composite reacts, thereby driving the residual penetrator material and other debris from the perforation.

The reactive composites are generally reactive with water and/or brine to generate local gas formation and/or energy release (e.g., generate heat) in a well or formation after a certain period of time and/or temperature. In one non-limiting embodiment, the reactive composites are formulated to begin generation of local gas formation and/or energy release after about 2 minutes of exposure to water and/or brine (e.g., 3 wt. % KCl water mixture, etc.) on a well or formation, typically after about 2-100 minutes (and all values and rages therebetween) of exposure to water and/or brine, more typically after about 5-90 minutes of exposure to water and/or brine, still more typically after about 15-80 minutes of exposure to water and/or brine, and yet more typically after about 20-60 minutes of exposure to water and/or brine, and the temperature of the water or brine is at least about 20° C., typically about 20-100° C. (and all values and ranges therebetween), more typically 25-80° C., and still more typically 30-60° C. The complete reaction of the reactive composites, once reaction of the reactive materials has begun, is generally 1-60 minutes (and all values and ranges therebetween), and typically 2-30 minutes.

The following non-limiting examples illustrate a few embodiments of the reactive composite in accordance with the present invention.

Example 1

Magnesium alloy powder containing nickel, iron, carbon, copper, cobalt, galvanic activators and/or dopants and having a particle size distribution of 0.5-10 microns is compounded in a mixing extruder with PVA at a concentration of 60 vol. %. The material is extruded into strands having a cross-section of 300 microns and chopped into roughly equiaxed particles in circulating oil. The particles are further coated with 10 microns of PVA using the evaporation of PVA in isopropyl alcohol. The resultant reactive composite is reactive with brine to generate local gas formation and energy release after a 30 minute delay after 50° C. exposure.

Example 2

Calcium metal is milled with PVA resin in isopropanol in a high energy mill. The isopropyl alcohol is evaporated and the PVA-coated fine calcium powder is mixed with additional PVA resin and extruded in a compounding extruder into 300 micron strands, which are chopped under oil into approximately equiaxed particles. A one-micron coating of PGA is added to the surface of the particles. The resultant particles react over a 10-15 minute period after a 5-minute delay in 55° C. brine.

Example 3

Magnesium powder is dry-milled under inert atmosphere with about 10-60 vol. % of 1-3 microns carbonyl iron powder (a composite of iron and carbon) and a small amount of $AlCl_3$ solid acid in isopropyl alcohol with PVA and stearic acid organic to produce a composite powder blend. The milled magnesium-iron-$AlCl_3$—PVA blend is granulated to form 0.2-0.5 mm reactive beads. The beads react with water to form $H_2$ and MgOH over a 3-20 minute period.

Example 4

1000 lbs. of 40-mesh reactive composites including calcium metal with an ethylcellulose binder and coating is blended into 250 gallons of diesel fuel and placed into an injector at the wellhead. The reactive composite and diesel mixture is continuously agitated and injected with a plunger injector in five-gallon increments every 30 seconds over a roughly 25-minute stimulation cycle. In such as arrangement, a slug of diesel fuel and reactive composite is added in between the stimulation fluid. The diesel fuel is used to inhibit or prevent the stimulation fluid from interacting with and/or reacting with the reactive composite until the reactive composite is positioned in a desire location or region of the well or formation. Thereafter, the reactive composite disperses with the proppant in the well or formation and the reactive composite reacts with the completion fluid (e.g., brine, water, etc.) to result in localized gas formation and/or heat generation which enhances the transport of the proppant in the well or formation by preventing drifting.

Example 5

1000 lbs. of 60/80-mesh reactive composites of the present invention is blended with 250 gallons of diesel. The 250 gallons of the reactive composite and diesel mixture is pumped in one slug into the formation after the completion of 100-mesh sand addition, and prior to the addition of 40/60-mesh sand for the main channel. The reactive composite is designed to have a 5-10 minute delay prior to the reaction of the reactive material, and the reaction of the reactive composite creates a formation energy/pressure release event 5-10 minutes after the commencement of the addition of conventional proppant, thereby creating local refluidization in the well or formation and opening and moving fine proppant into the far field natural fracture network of the well or formation. A 5-25 vol. % increase in propped fracture area can be created as a result of the treatment.

Figure 11:
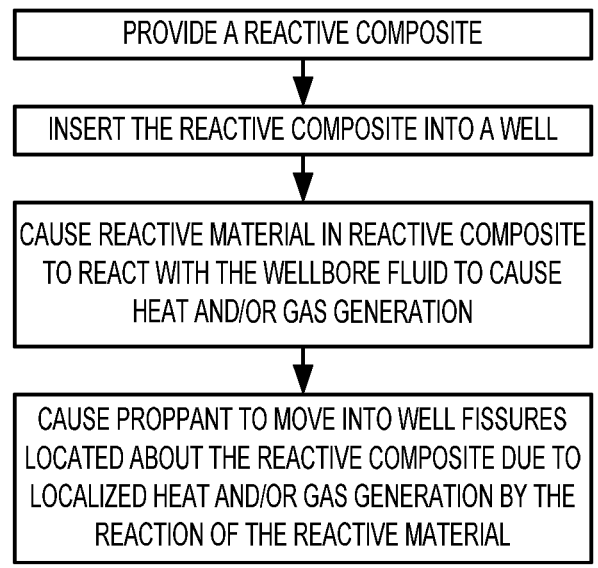
FIG. 11 is a flow chart illustrating a non-limiting method in accordance with the present invention wherein a reactive composite is inserted into a well and the reactive composite is caused to react with the wellbore fluid in the well to thereby generate localized heat and/or localized increased pressure in the well, which localized heat and/or localized increased pressure causes the proppant in the area of reaction of the reactive composite to move or flow into well fissures located about the reactive composite.
Figure 12:
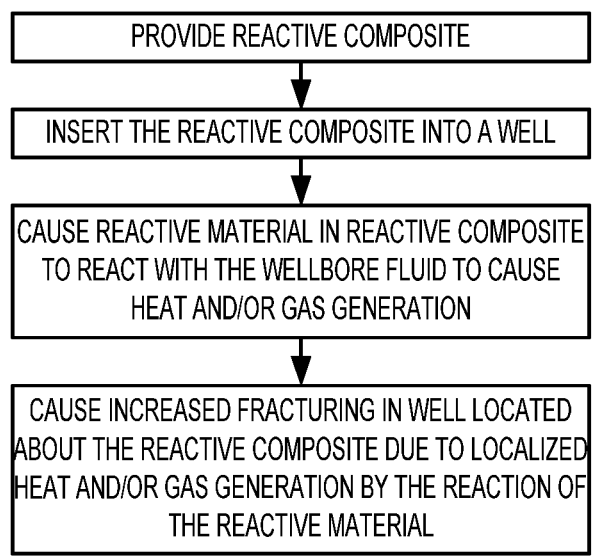
FIG. 12 is a flow chart illustrating a non-limiting method in accordance with the present invention wherein a reactive composite is inserted into a well and the reactive composite is caused to react with the wellbore fluid in the well to thereby generate localized heat and/or localized increased pressure in the well, which localized heat and/or localized increased pressure causes increased fracturing in the well located about the reactive composite.
Figure 13:
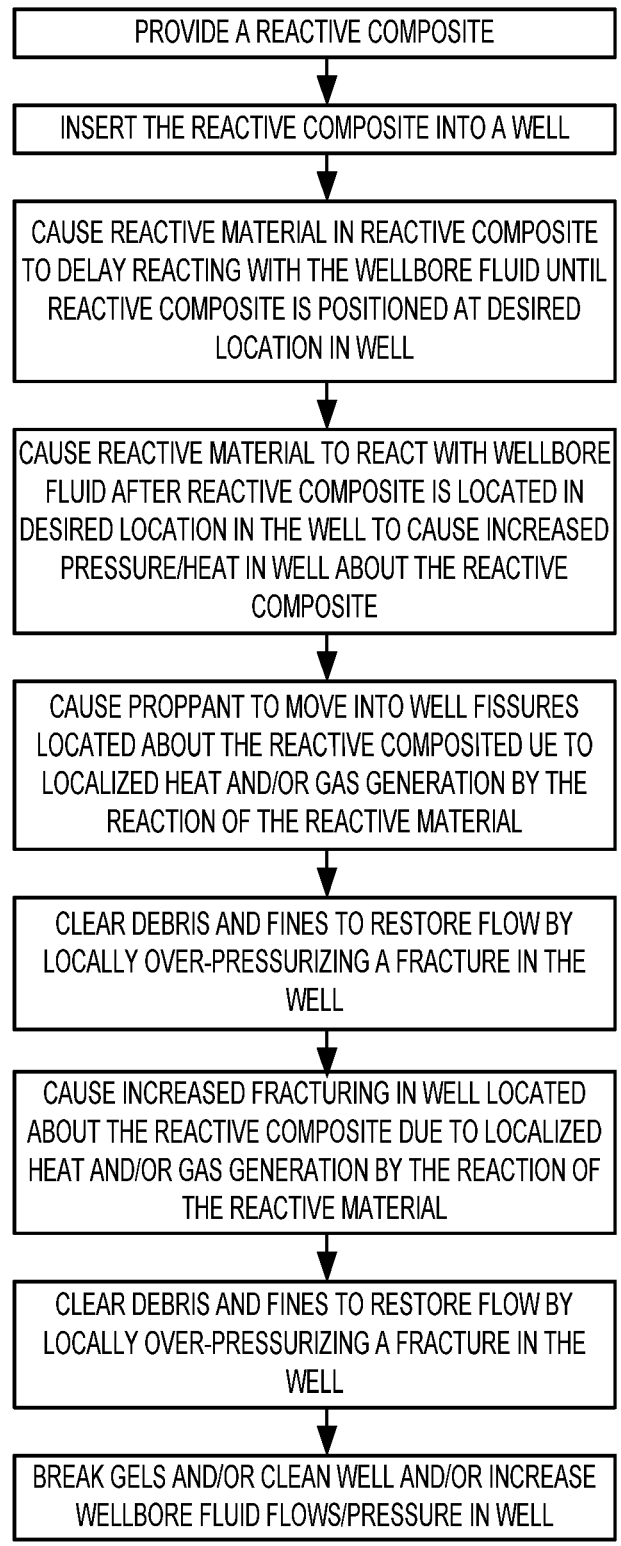
FIG. 13 is a flow chart illustrating a non-limiting method in accordance with the present invention wherein a reactive composite is inserted into a well, and wherein the reaction of the reactive composite is delayed until the reactive composite is positioned in a desired location in the well, and thereafter the reactive composite is caused to react with the wellbore fluid in the well to thereby generate localized heat and/or localized increased pressure in the well. The dashed boxes set forth one or more possible effects of the generated localized heat and/or localized increased pressure in the well caused by the reaction of the reactive composite. As such, the effects set forth in one or more of the dashed boxes can occur when the reactive composite causes localized heat and/or localized increased pressure in the well.

Non-limiting methods for using the reactive composite of the present inventions are set forth in FIGS. 11-13.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. A method of stimulating a well or geologic formation including:
    a. providing reactive composite, said reactive composite includes A) i) a reactive material, and ii) a polymer and/or inorganic material, said reactive material includes a metal element, hydride of said metal element, amine that includes said metal element, borohydride that includes said metal element, said metal elements including magnesium, calcium, lithium, sodium, potassium, cesium, iron, aluminum, boron, zinc, nickel, cobalt, tungsten, titanium, and/or zirconium, said polymer and/or inorganic material is a binder and/or coating, said reactive material is formulated to react with water and/or another type of oxidizer in a controlled manner to create heat and/or gas generation, said polymer including ethycellulose, PVA, PGA, PLA, PLGA, hydrolysable polymeric material, fluorinated polymer, and/or water-soluble polymeric material, said inorganic material including $AlCl_3$, sodium bisulfate, $CaCO_3$, $CaOH_3$, hydroxide, calcium, sodium, metal hydride, a solid acid catalyst, water-reactive alkali metal, alkaline earth metal, metal hydride, and/or carbonate material; B) a fuel-oxidizer system that includes a reactive core, a reactive core fuel, and an outer coating, said reactive core includes calcium, ammonium nitrate and/or magnesium, said reactive core fuel includes diesel, gasoline, oil, fuel oil, natural gas. liquefied natural gas, or other gas or liquid combustible petroleum product, said outer coating includes a polymer material that is formulated to degrade/dissolve when exposed to i) a certain type of fluid, ii) a certain temperature, iii) a certain chemical, and/or iv) a certain pH;
    C) a reactive core formed of magnesium alloy powder and binder, an outer coating formed about said core, said magnesium constituting greater than 50 wt. % of said magnesium alloy, said magnesium alloy including nickel, iron, carbon, copper, and/or cobalt, said magnesium alloy powder having an average particle size of 0.5-10 microns, said binder including a polymer, said magnesium alloy evenly dispersed in said binder, said outer coating including a polymer; D) a reactive core of calcium metal and polymer and an outer coating of polymer; E) 40-90 vol. % magnesium powder and 10-60 vol. % carbonyl iron powder and 0.1-10 vol. % $AlCl_3$ solid acid and polymer; or F) a reactive core of calcium metal and a polymer and a polymer coating about said calcium metal and polymer mixture;
    b. placing a plurality of said reactive composite into said well or geologic formation by pumping said reactive composite with a fluid into said well or geologic formation; and,
    c. reacting said plurality of reactive composite with well bore fluid or formation fluid to create heat and/or pressure in said well or geologic formation, said created heat and/or pressure is used to A) activate a downhole device; B) enhance fracture conductivity by extending fractures and/or increasing fractures; C) removing asphaltenes and/or paraffins; D) cause proppant to move into well fissures; E) cause fluidization of proppant to reduce or prevent dune formation by said proppant in said well or geologic formation; F) modify formation-fracture interfaces; G) break and/or clear gels in said well or geologic formation; H) clear debris and fines in said well or geologic formation; I) increase or accelerate wellbore fluid flows in said well or geologic formation; J) agitate and/or resuspend proppant in said well or geologic formation; and/or K) increase pressure in said well or geologic formation.

2. The method as defined in claim 1, wherein said reactive composite includes $KClO_4$, $Bi_2O_3$, PVDF, PTFE, $C_3F_6$, $Fe_3O_4$, CuO, and/or $Fe_2O_3$.

3. The method as defined in claim 1, wherein said polymer and/or inorganic material includes ethylcellulose, PVA and/or PLGA.

4. The method as defined in claim 1, wherein said reactive composite includes PGA, $AlCl_3$, and/or sodium bisulfate.

5. The method as defined in claim 1, wherein said reactive composite includes oxidizer formulated to react with said reactive material, said oxidizer including PVDF, $KClO_4$, $C_3F_6$, $Fe_3O_4$, $Fe_2O_3$, CuO, and/or $Bi_2O_3$.

6. The method as defined in claim 1, wherein said reactive composite includes accelerant, said accelerant includes gallium, nickel and/or acid.

7. The method as defined in claims 1, wherein said core of said reactive composites include Mg—$Fe_2O_3$, Mg-PTFE, and/or Al-PTFE, a reactive coating coated about said core, and an outer coating formulated to degrade/dissolve.

8. The method as defined in claim 7, wherein said reactive coating includes a water-reactive alkali metal, alkaline earth metal and/or metal hydride.

9. The method as defined in claim 7, wherein said reactive coating includes calcium, sodium, metal hydride, and/or a solid acid catalyst.

10. The method as defined in claim 1, wherein said reactive composite is placed in said well or geologic formation by adding said reactive composite to fluid and then pumping said fluid into said well or geologic formation and/or pumping said reactive composite into said well or geologic formation.

11. The method as defined in claim 10, wherein said reactive composite is blended with said fluid at a rate of 0.1-10 lbs./gallon of fluid when said reactive composite and said fluid are pumped into said well or geologic formation.

12. The method as defined in claim 1, wherein said reactive composite is added to a non-reactive fluid such as diesel fuel. $N_2$, liquefied natural gas, natural gas, $CO_2$ when inserting said reactive composite into said well or geologic formation.

13. The method as defined in claim 12, wherein said nonreactive fluid and said reactive composite are injected or pulsed into said wellbore fluid during a pumping operation during insertion of said reactive composite into said well or geologic formation.

14. The method as defined in claim 1, wherein said activation of said downhole device includes placing said reactive composite inside a container and causing said reactive composite to generate local pressure or force in said container so as to activate said downhole device, said downhole device is selected from a setting tool, a bridge plug, a frac plug, a perforation device, a sleeve, a valve, or a packer.

15. A method of stimulating a well or geologic formation including:
   a. providing reactive composite, said reactive composite includes A) a fuel-oxidizer system that includes a reactive core and an outer coating of reactive core fuel, said reactive core includes ammonium nitrate and/or magnesium, said reactive core fuel includes diesel, gasoline, oil, fuel oil, natural gas, liquefied natural gas, or other gas or liquid combustible petroleum product. said outer coating includes a polymer material that is formulated to degrade/dissolve when exposed to I) a certain type of fluid, II) a certain temperature, III) a certain chemical, and/or IV) a certain pH; B) a reactive core formed of magnesium alloy powder and binder, an outer coating formed about said core, said magnesium constituting greater than 50 wt. % of said magnesium alloy, said magnesium alloy including nickel, iron, carbon, copper, and/or cobalt, said magnesium alloy powder having an average particle size of 0.5-10 microns, said binder including PVA, said magnesium alloy evenly dispersed in said binder, said outer coating including PVA, said reactive composite particle is reactive in brine to generate local gas formation and energy release after a 10-60 minutes delay at temperatures of 40-60° C.; C) a reactive core of calcium metal and PV A resin and an outer coating of PGA, said reactive composite particle is reactive in brine to generate local gas formation and energy release after a 2-10 minutes delay at temperatures of 40-60° C., and said calcium metal core reacts over a period of 5-30 minutes; D) 40-90 vol. % magnesium powder and 10-60 vol. % carbonyl iron powder and 0.1-10 vol. % $AlCl_3$ solid acid and PVA, said reactive composite particle is reactive in brine to generate local gas formation and energy release at temperatures of 40-60° C. for a 2-60 minute period; or E) a reactive core of calcium metal and an ethylcellulose binder and a polymer coating about said core;
   b. placing a plurality of said reactive composite into said well or geologic formation by pumping said reactive composite with a fluid into said well or geologic formation; and,
   c. reacting said plurality of reactive composite with well bore fluid or formation fluid to create heat and/or pressure in said well or geologic formation, said created heat and/or pressure is used to A) activate a downhole device; B) enhance fracture conductivity by extending fractures and/or increasing fractures; C) removing asphaltenes and/or paraffins; D) cause proppant to move into well fissures; E) cause fluidization of proppant to reduce or prevent dune formation by said proppant in said well or geologic formation; F) modify formation-fracture interfaces; G) break and/or clear gels in said well or geologic formation; H) clear debris and fines in said well or geologic formation; I) increase or accelerate wellbore fluid flows in said well or geologic formation; J) agitate and/or resuspend proppant in said well or geologic formation; and/or K) increase pressure in said well or geologic formation.

16. The method as defined in claim 15, wherein said reactive composite further includes a catalytic initiator material.

17. The method as defined in claim 15, wherein said reactive composite is placed in said well or geologic formation by adding said reactive composite to fluid and then pumping said fluid into said well or geologic formation and/or pumping said reactive composite into said well or geologic formation.

18. The method as defined in claim 15, wherein said reactive composite is blended with said fluid at a rate of 0.1-10 lbs./gallon of fluid when said reactive composite and said fluid are pumped into said well or geologic formation.

19. The method as defined in claim 15, wherein said reactive composite is added to a non-reactive fluid such as diesel fuel. $N_2$, liquefied natural gas, natural gas, $CO_2$ when inserting said reactive composite into said well or geologic formation.

20. The method as defined in claim 19, wherein said nonreactive fluid and said reactive composite are injected or pulsed into said wellbore fluid during a pumping operation during insertion of said reactive composite into said well or geologic formation.

21. The method as defined in claim 15, wherein said activation of said downhole device includes placing said reactive composite inside a container and causing said reactive composite to generate local pressure or force in said container so as to activate said downhole device, said downhole device is selected from a setting tool, a bridge plug, a frac plug, a perforation device, a sleeve, a valve, or a packer.

\* \* \* \* \*